United States Patent Office.

WILLIS LESLIE SARGENT, OF NORWICH, CONNECTICUT.

LUBRICANT FOR BICYCLE CHAINS AND BEARINGS.

SPECIFICATION forming part of Letters Patent No. 519,096, dated May 1, 1894.

Application filed October 23, 1893. Serial No. 488,967. (No specimens.)

*To all whom it may concern:*

Be it known that I, WILLIS LESLIE SARGENT, a citizen of the United States, residing at Norwich, county of New London, and State of Connecticut, have invented a new and useful Composition of Matter to be Used for Lubricating Bicycle Chains and Bearings of all Kinds, of which the following is a specification.

My composition consists of the following ingredients, combined in the proportions stated, viz: castile soap (ground fine) twenty-five pounds, black lead (called graphite) fifty pounds, alcohol (best) six gallons.

In preparing the composition, the soap and alcohol are mixed, and the mixture allowed to stand until the soap is dissolved or "cut," after which it is boiled for five minutes; then the black lead is to be thoroughly incorporated with the alcohol and soap prepared as above stated, thus forming a thick paste. Used as a lubricant, it forms a thin coating and thus protects the bearings from wear. Used on bicycle chains, it will not gum, will keep the chain from rusting or rattling, remove dust, and neither dust nor sand will adhere to it. If chain or bearing is in constant use, the lubricant should be applied once a week.

What I claim, and desire to secure by Letters Patent of the United States, is—

The herein described composition of matter to be used for lubricating bicycle chains and bearings of all kinds, consisting of alcohol, castile soap and black lead in the proportions specified.

WILLIS LESLIE SARGENT.

Witnesses:
ARTHUR W. CURLISS,
RICHARD D. LYONS.